No. 744,312. PATENTED NOV. 17, 1903.
T. I. DUFFY.
BAIL HANDLE FOR CARPET SWEEPERS.
APPLICATION FILED DEC. 26, 1902.
NO MODEL.
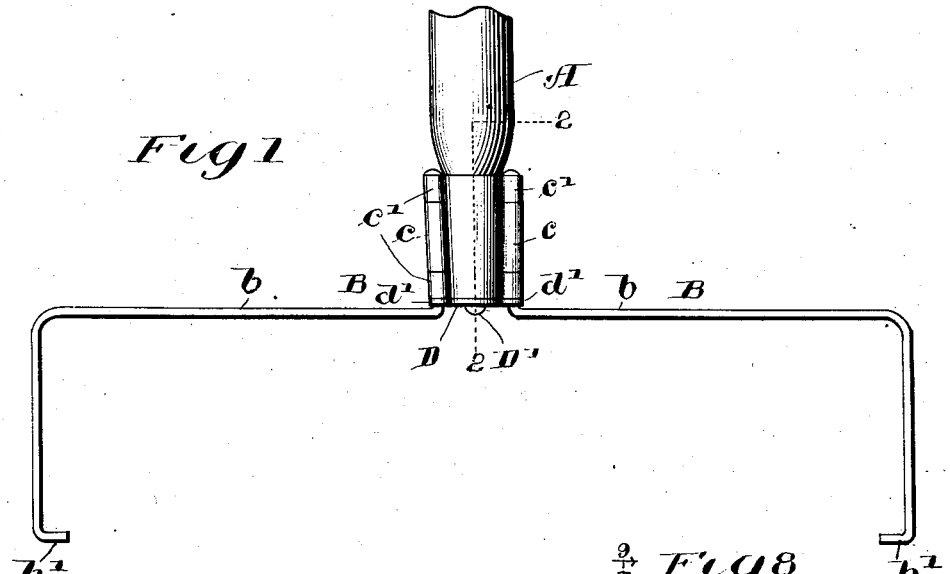
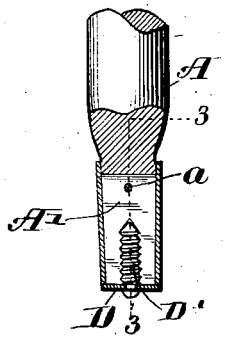
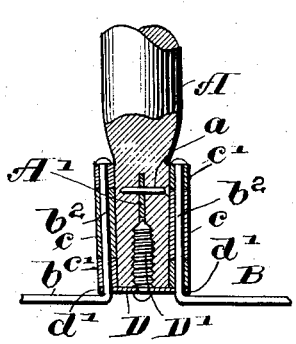
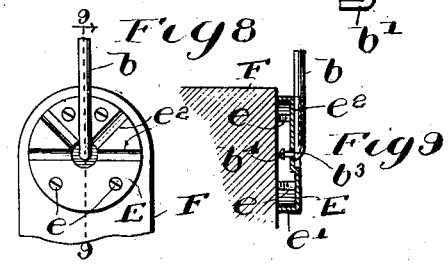
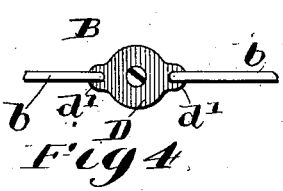
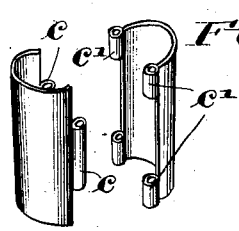
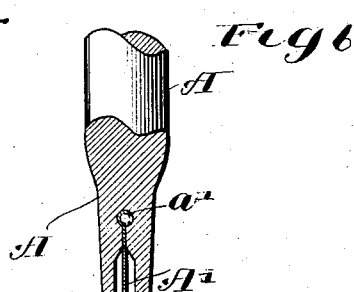
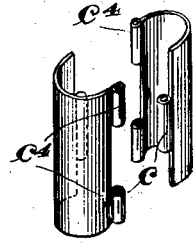
Witnesses:
Carl H. Crawford
Gertrude Bryce
Inventor:
Thomas I. Duffy
by Poole & Brown
his Attorneys No. 744,312. Patented November 17, 1903.

UNITED STATES PATENT OFFICE.

THOMAS I. DUFFY, OF AUSTIN, ILLINOIS, ASSIGNOR, BY DIRECT AND MESNE ASSIGNMENTS, TO ABNER CROSSMAN, TRUSTEE, OF CHICAGO, ILLINOIS.

BAIL-HANDLE FOR CARPET-SWEEPERS.

SPECIFICATION forming part of Letters Patent No. 744,312, dated November 17, 1903.

Application filed December 26, 1902. Serial No. 136,604. (No model.)

*To all whom it may concern:*

Be it known that I, THOMAS I. DUFFY, of Austin, in the county of Cook and State of Illinois, have invented certain new and useful Improvements in Bail-Handles for Carpet-Sweepers and Like Devices; and I do hereby declare that the following is a full, clear, and exact description thereof, reference being had to the accompanying drawings, and to the letters of reference marked thereon, which form a part of this specification.

This invention relates to improvements in bail-handles and fastening devices therefor for carpet-sweepers, brooms, brushes, and the like; and the invention consists in the matters hereinafter set forth, and more particularly pointed out in the appended claims.

In the drawings, Figure 1 is a side elevation, partially broken away, of a bail-handle made in accordance with my invention. Fig. 2 is a detail section taken on line 2 2 of Fig. 1. Fig. 3 is a detail section taken on line 3 3 of Fig. 2. Fig. 4 is a bottom plan view of the handle, showing parts of the attached bail. Fig. 5 is a perspective view of the two-part ferrule at the end of the handle by which the bail is attached thereto, the parts being separated. Fig. 6 is a modification of the means for affixing the bail-ferrule to the sweeper-handle. Fig. 7 is a top section of a modified form of the two-part ferrule by which the handle is joined to the bail. Fig. 8 is a face view of a device for pivotally connecting the bail with the device with which it is used. Fig. 9 is a section taken on line 9 9 of Fig. 8.

First referring to the construction shown in Figs. 1 to 5, inclusive, A designates a wood handle, and B a bail connected to the lower end thereof. Said bail consists of two like metal parts, which are joined rigidly to the handle by a metal ferrule. As herein shown, said bail consists of two like parts $b\ b$, each comprising a vertical member, on the lower end of which is formed a hook $b'$, adapted for attachment to the device in connection with which the bail is used, and a horizontal member, said horizontal members meeting at the center of the bail and being joined to the handle A by the ferrule before mentioned.

The ferrule herein shown consists of two sheet-metal parts, which embrace the lower end of the handle. Said parts of the ferrule are folded at their meeting margins to form short sleeve-sections $c\ c'$, respectively, which when the parts of the ferrule are assembled meet end to end to form sleeves adapted to receive the upturned portion $b^2$ of the horizontal members of the bail. To this end one of the margins of each of the ferrule parts is shown as provided with a short central fold or sleeve-section $c$, and the adjacent margins of the other part is provided with two short sleeve-sections $c'$, between which said central sleeve-section fits end to end. The upturned parts $b^2$ of the bail member when inserted into said sleeves constitute a connection for the parts of the ferrule which hold them in their proper relative positions to constitute the complete ferrule. Said upturned portions of the bail members extend above the sleeves of the ferrule and are upset thereover to hold the same in place. The two parts of the ferrule may be made of identical shape and dimensions, as shown in Fig. 7, so that the two sheet-metal parts thereof may be made by the use of a single die, each half of the ferrule being provided on one margin thereof with a centrally-located sleeve-section $c$ and on its other margin with two longitudinally-separated sleeve-sections $c^4$, said sleeve-sections interfitting in the manner before described. Said two-part ferrule is attached to the handle by means of a plate D, which fits against the end of the handle and is provided with extensions $b'$, which are apertured for the passage of the part $b^2$ of the bail therethrough. The plate D is affixed to the handle by means of a screw-stud D', which enters an axial socket in the lower end of the handle and engages screw-threads formed on the inner margin of a notched flat plate A', which occupies a slit or saw-kerf in the end of the handle and is held therein by means of a nail $a$. The lower end of said screw-threaded stud is reduced and extends through a central aperture in the plate D and is upset on the lower surface of said plate, whereby said plate is rigidly fixed to the handle, and the plate acts to hold the ferrule from endwise movement on the handle.

In lieu of the nail $a$ for holding the plate in place the plate may be provided at its upper edge with a roll or flange $a'$, as shown in Fig. 6, adapted to occupy an enlarged transverse opening in the top of the slit or saw-kerf. In this construction the plate is inserted into said slit from the side thereof and is held from lateral displacement by the screw-threaded stud $D'$, before mentioned.

The construction described for joining the bail with the handle is an advantageous one, for the reason that it avoids screw-threads at the end of the handle and also enables the bail to be made of two like metal parts which possess sufficient resiliency to be readily applied to and detached from the sweeper, brush, or other device in connection with which it is adapted to be used. The connecting-ferrule may be economically made by a stamping process, and therefore adds but little to the cost of the device. Moreover, the bail and its connection with the handle are durable and are not likely to become loosened by the vibration or jars brought upon the device in connection with which the bail-handle is used.

In Figs. 7 and 8 I have shown a device for pivotally connecting the bail with a carpet-sweeper or the like. Said device consists of a metal plate $E$, which is secured to the sweeper-casing $F$ or to the body of a broom or brush by means of nails or screws $e$. Said plate is provided with a central opening to receive the hook end of the bail. Said hook end of the bail is reduced to provide outside of the plate an inwardly-facing shoulder $b^3$, and the extreme end of the hook inside of the plate is upset to form a head or enlargement $b^4$. Said shoulder and head are separated a sufficient distance to afford a limited lateral play of the side or vertical member of the bail, and the plate is provided with a marginal inwardly-directed flange $e'$, which fits against the end of the sweeper-casing or brush-body, so as to provide between the plate and said casing or body a space to permit the hook to shift inwardly and outwardly. If the flange $e'$ be made shallower than shown or be omitted, the space for the necessary movement of the hook may be provided by making a socket in the adjacent face of the sweeper-casing or brush-body in line with the hook. Said plate $E$ is provided with a plurality of radial depressions $e^2$, extending from the central opening to the margin thereof and adapted to receive the vertical part of the bail when the latter is in line with said depressions. The resiliency of the bail serves to hold the vertical parts of the bail inwardly when in line with the depressions. When said vertical members of the bail so occupy said depressions, the brush, sweeper, or the like in connection with which the handle is used serves to hold the same somewhat rigidly with respect to the handle, so that the handle may be held at a desired inclination with respect to the sweeper or brush until intentionally changed. The depressions are made concave in cross-section, whereby the vertical members of the bail may be readily sprung out of the depression when desired. Said depressions are located on both sides of the pivotal axis of the bail, whereby said bail may be swung to either side of the sweeper or brush and temporarily locked in such position in the manner above set forth.

I claim as my invention—

1. The combination with a handle, of a bail comprising two similar parts, each consisting of a vertical and a horizontal member, and means for joining the adjacent ends of the horizontal members of the bail to the handle, comprising a ferrule fitted to the end of the handle and provided at its opposite sides with sleeves which are flush at their inner ends with the end of the ferrule and upturned parts on the horizontal bail members adapted to fit within and be secured to said sleeves.

2. The combination with a handle, of a bail comprising two like members provided at their adjacent ends with upturned parts, a two-part ferrule on the handle provided at its opposite sides with sleeve-sections which fit end to end to constitute sleeves within which fit the upturned parts of the bail members.

3. The combination with a handle, of a bail comprising two like parts, each consisting of a vertical and a horizontal member, the horizontal members being provided with upturned parts, means for joining the handle with the upturned parts of the bail members comprising a two-part ferrule on the handle provided on its opposite sides with sleeve-sections within which fit and are secured the upturned parts of the bail members.

4. The combination with a handle, of a bail comprising two similar parts, each consisting of a vertical member, and a horizontal member provided with an upturned part, means for connecting the handle with the horizontal members of the bail comprising a two-part ferrule, the margins of the parts of which are provided with sleeve-sections, which, when the parts of the ferrule are assembled, fit end to end to constitute sleeves to receive the upturned parts of the bail members and means for fastening said two-part ferrule to the handle.

5. The combination with a handle, of a bail comprising two similar members provided at their adjacent ends with upturned parts, and means for connecting the handle with the members of the bail, comprising a ferrule provided with sleeves which receive the upturned parts of the bail members, and means for fastening said ferrule to the handle comprising a plate fixed to the end of the handle, said plate being provided with apertured, lateral extensions through which the upturned ends of the bail members extend.

6. The combination with a handle, of a bail comprising two similar members provided at their adjacent ends with upturned parts, and means for connecting the handle with the members of the bail, comprising a ferrule, provided with sleeves which receive the upturned parts of the bail members, and means for fastening said ferrule to the handle comprising a screw-threaded stud seated in a socket in the end of the handle and a plate fitted against the end of the handle and secured to said stud, said plate being provided in line with said sleeves with apertures through which said upturned parts of the bail members extend.

7. The combination with a handle, of a bail comprising two similar members provided at their adjacent ends with upturned parts and means for connecting the handle with the bail members comprising a ferrule provided with sleeves which receive the upturned ends of said bail members and means for fastening said ferrule to the handle comprising a screw-threaded stud which is seated in a socket in the end of the handle, a flat plate occupying a slit in the handle and provided with a notch having on its margins screw-threads which are engaged by the screw-threaded stud, and a plate fitting against the end of the handle and provided with apertures through which the upturned end of the bail members pass, said plate being affixed to said screw-stud.

In testimony that I claim the foregoing as my invention I affix my signature, in presence of two witnesses, this 22d day of December, A. D. 1902.

THOMAS I. DUFFY.

Witnesses:
WILLIAM L. HALL,
GERTRUDE BOYCE.